United States Patent [19]

Hama et al.

[11] Patent Number: 5,072,814

[45] Date of Patent: Dec. 17, 1991

[54] HYDRAULICALLY OPERABLE TRANSMISSION

[75] Inventors: Masaaki Hama; Junichirou Inoue, both of Osaka, Japan

[73] Assignee: Kubota Corporation, Osaka, Japan

[21] Appl. No.: 579,522

[22] Filed: Sep. 10, 1990

[30] Foreign Application Priority Data

Jan. 9, 1990 [JP] Japan ............................. 2-2358

[51] Int. Cl.⁵ ..................... B60K 41/22; F16D 25/14
[52] U.S. Cl. .................................. 192/3.57; 192/52; 192/85 R; 192/109 F
[58] Field of Search ................ 192/3.55, 3.57, 52, 192/85 R, 87.11, 87.17, 109 F

[56] References Cited

U.S. PATENT DOCUMENTS

| | | | |
|---|---|---|---|
| 4,046,162 | 9/1977 | Rodeghiero | 192/109 F X |
| 4,465,168 | 8/1984 | Sato | 192/3.57 |
| 4,646,519 | 3/1987 | Inagaki et al. | 192/85 R X |
| 4,711,329 | 12/1987 | Hasegawa et al. | 192/3.57 |
| 4,924,983 | 5/1990 | Katayama et al. | 192/52 |
| 4,949,264 | 8/1990 | Katayama et al. | 364/424.1 |

FOREIGN PATENT DOCUMENTS

| | | |
|---|---|---|
| 61-252922 | 11/1986 | Japan ............................. 192/87.17 |
| 62-215155 | 9/1987 | Japan . |
| 63-312522 | 12/1988 | Japan . |
| 63-318352 | 12/1988 | Japan . |

Primary Examiner—Richard Lorence
Attorney, Agent, or Firm—Edwin E. Greigg; Ronald E. Greigg

[57] ABSTRACT

A hydraulically operable transmission comprises change speed gears, a hydraulic clutch, and a hydraulic circuit for operating the change speed gears and hydraulic clutch. The hydraulic circuit includes a plurality of hydraulic actuators interlocked with the change speed gears, and a pilot type control valve for controlling the hydraulic actuators. An oil line leading to the hydraulic clutch includes a pressure increase adjustor for adjusting pressure increase characteristics when the hydraulic clutch is engaged. The pressure increase adjustor includes, arranged parallel to one another, a normally open first switch valve closable when a secondary hydraulic pressure exceeds a first set level, a normally closed second switch valve openable when the secondary hydraulic pressure exceeds a second set level higher than the first set level, and a restrictor. The first switch valve is urged toward an open position by a spring whose urging force is increased when the control valve is operated to a high speed range.

5 Claims, 4 Drawing Sheets

HYDRAULICALLY OPERABLE TRANSMISSION

BACKGROUND OF THE INVENTION

The present invention relates to a hydraulically operable transmission with change speed gears, and more particularly to a hydraulically operable transmission used for propelling a vehicle.

DESCRIPTION OF THE PRIOR ART

The agricultural tractor is one of the fields to which the transmission according to the present invention is applicable. Japanese Patent Publication Kokai No. 63-318352 discloses an example of agricultural tractors, which comprises hydraulic actuators for operating propelling change speed gears, a pilot type control valve for supplying and exhausting pressure oil to/from the hydraulic actuators, and a hydraulic clutch of the propelling drive line engaged and disengaged when the change speed gears are operated by the control valve. The driver needs only to operate the control valve to engage and disengage the hydraulic clutch and effect change speed through the hydraulic actuators automatically.

In order for the hydraulic clutch to be engaged smoothly at times of change speed operation, the construction disclosed in the above publication has, connected parallel to one another, a normally open first switch valve (referenced 20 in the publication) which is closed when a secondary hydraulic pressure exceeds a first set level (referenced P1 or P2 in FIG. 3 of the publication), a normally closed second switch valve (referenced 20 in the publication) which is opened when the secondary hydraulic pressure exceeds a second set level (referenced P0 in FIG. 3 of the publication) higher than the first set level, and a restrictor (referenced 21 in the publication). According to this construction, pressure oil is supplied to the hydraulic clutch (referenced C in the publication) with pressure characteristics as illustrated in FIG. 3 of the publication.

Further, in this construction, the first switch valve consists of two switch valves which are closable by different secondary hydraulic pressures. When a change speed is effected in a high speed range, the pressure oil is caused to flow through the switch valve closable by the higher secondary hydraulic pressure. Consequently, the hydraulic clutch reaches a half-clutch state relatively quickly in the high speed range, and relatively slowly in a low speed range. In this way the hydraulic clutch is smoothly engaged in both the high speed range and low speed range.

However, this construction requires a relatively large number of components including the two first switch valves, oil lines connected to the two first switch valves, and a selector valve (referenced 22 in the publication) for distributing the pressure oil to the two first valves. Thus, there is room for improvement to reduce the number of components and simplify the construction.

SUMMARY OF THE INVENTION

An object of the present invention is to provide a hydraulically operable transmission for allowing a hydraulic clutch to be engaged smoothly in both the high speed range and low speed range while avoiding an increased number of components and a complicated construction.

In order to fulfill the above object, a hydraulically operable transmission according to the present invention comprises change speed gears; a hydraulic change speed control device for operating the change speed gears, including a plurality of hydraulic actuators interlocked with the change speed gears, and a pilot type control valve for supplying and discharging pressure oil to/from the hydraulic actuators, thereby changing the transmission from a low speed condition to a high speed condition; a hydraulic clutch engageable and disengageable with a change speed operation of the change speed gears caused by the control valve; an oil line for supplying pressure oil to the hydraulic clutch; and a pressure increase adjusting device connected to the oil line for adjusting pressure increase characteristics when the hydraulic clutch is engaged; the pressure increase adjusting device including a normally open first switch valve closable when a secondary hydraulic pressure exceeds a first set level, a normally closed second switch valve openable when the secondary hydraulic pressure exceeds a second set level higher than the first set level, a restrictor, a spring for urging the first switch valve toward an open position, and an urging force varying device for varying urging force of the spring, the urging force varying device being operable by a pilot pressure to increase the urging force of the spring when the hydraulic change speed control device is operated to a high speed position, the first and second switch valves and the restrictor being provided on the oil line and connected parallel to one another.

In the pressure increase adjusting device of this transmission, the first set level of the secondary hydraulic pressure for closing the normal open first switch valve is determined by the urging force of the spring that urges the first switch valve toward the open position. Thus, according to the present invention, the first set level for closing the first switch valve may be varied by varying the urging force of the spring.

Consequently, in the present invention the first set level (corresponding to the pressure at which the hydraulic clutch attains a half-clutch state) is variable by one first switch valve as distinct from the prior construction which varies the first set level by the two first switch valves. This allows a large half-clutch range for a low speed state, i.e. for clutching in a great torque condition, and a small half-clutch range for a high speed state, i.e. for clutching in a small torque condition.

The construction for varying the urging force of the spring of the first switch valve is not very complicated since the urging force is varied by a pilot pressure produced by the change speed control device formed of the hydraulic actuators and control valve.

As described above, the construction for varying the first set level for the propelling system hydraulic clutch in accordance with change speed conditions, according to the present invention, dispenses with one first switch valve and the oil line connected thereto as required in the prior art. The construction according to the present invention has a reduced number of components and a simplified construction compared with the prior construction.

Other features and advantages of the present invention will be apparent from the following description.

BRIEF DESCRIPTION OF THE DRAWINGS

The drawings show a hydraulically operable transmission according to the present invention, in which.

DESCRIPTION OF THE PREFERRED EMBODIMENTS

An embodiment of the present invention will be described hereinafter with reference to the drawings.

Figure 1:
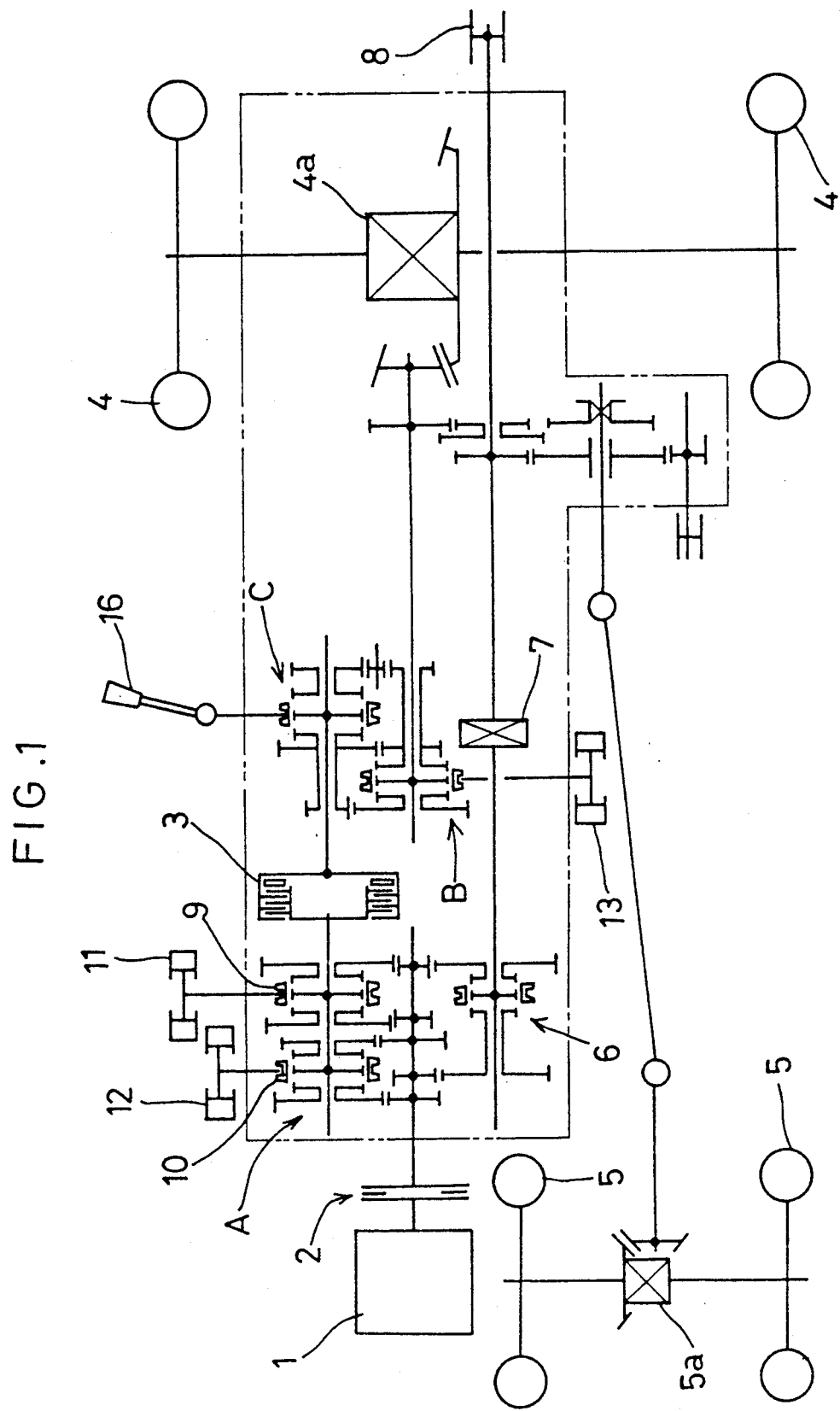
FIG. 1 is a schematic view of the entire transmission.

FIG. 1 shows a drive system of a four wheel drive agricultural tractor which is one example of working vehicles. The drive system transmits power of an engine 1 through a main clutch 2, a main change speed gearing A, a multidisk hydraulic clutch 3, and an auxiliary change speed gearing B, to a backward/forward changeover device C. The power is transmitted from the auxiliary change speed gearing B to a differential 4a for rear wheels 4. Power is branched out immediately upstream of the differential 4a for transmission to a differential 5a for front wheels 5 as well. The power output from the main clutch 2 is also transmitted through a PTO change speed device 6 and a one-way rotary clutch 7 to a PTO shaft 8. The main change speed gearing A includes two sets of synchromesh change speed gear mechanisms 9 and 10 to provide four speeds. The auxiliary change speed gearing B which provides two, high and low, speeds, and the backward/forward changeover device C also comprise synchromesh gear mechanisms. Some gears are shared by the auxiliary change speed gearing B and backward/forward changeover device C.

Figure 2:
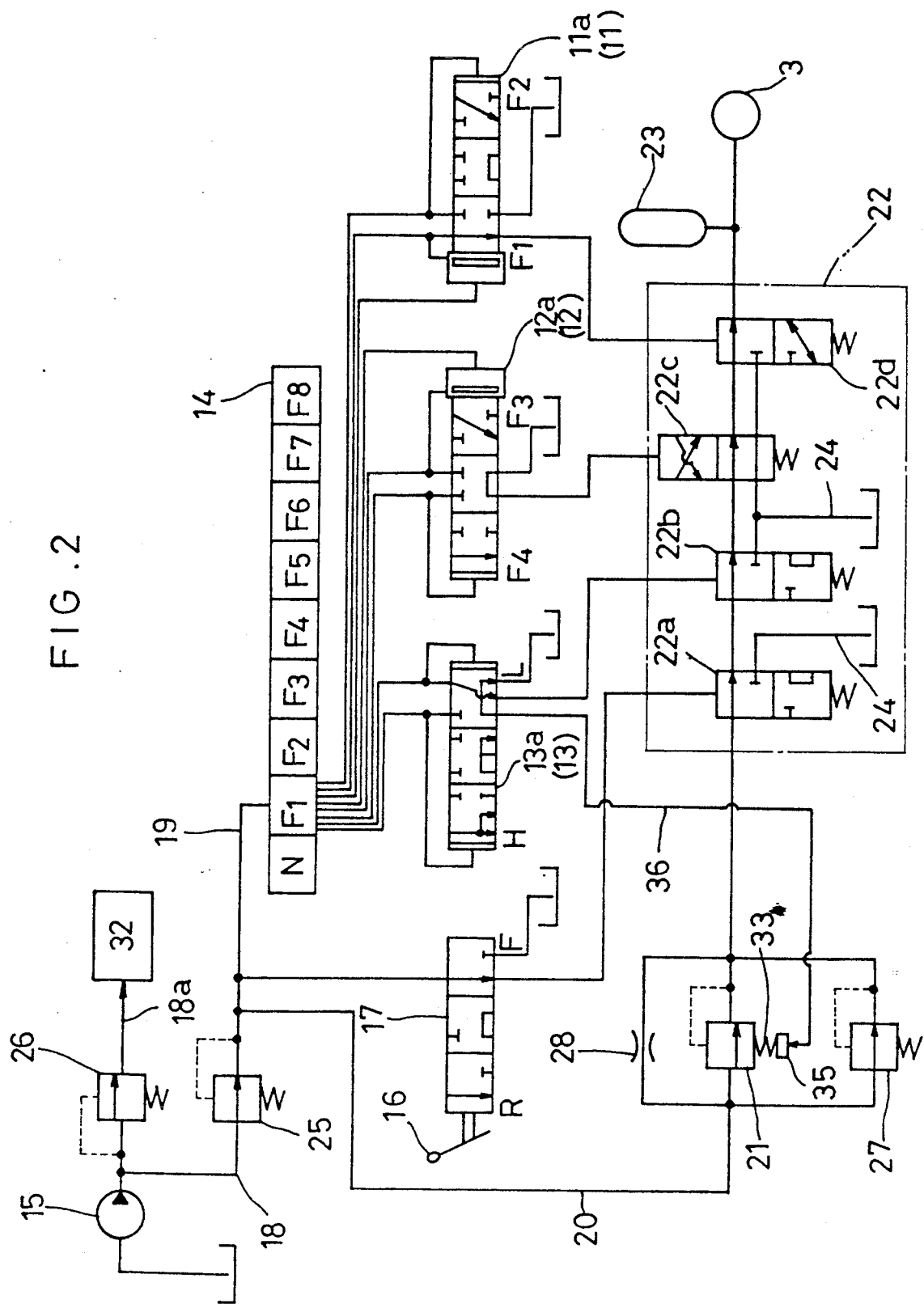
FIG. 2 is a hydraulic circuit diagram.

As seen from FIG. 1, the main change speed gearing A is operable by two hydraulic cylinders 11 and 12, while the auxiliary change speed gearing B is operable by one hydraulic cylinder 13. These three cylinders 11, 12 and 13 are operable by pressure oil supplied from a pump 15 through a speed control valve 14 as shown in FIG. 2. Thus, eight speeds are provided by oil supply and discharge under control by the control valve 14.

As shown in FIG. 2, the hydraulic cylinders 11, 12 and 13 have control sections thereof in form of selector valves 11a, 12a and 13a, respectively. A pilot pressure is produced when each selector valve is operated to neutral. The hydraulic cylinder 13 for actuating the auxiliary change speed gearing B is operable only in two positions, i.e. a low speed position L and a high speed position H. The selector valve 13a of this cylinder 13 has neutral effective only in the course of operation from one operative position to the other.

The backward/forward changeover device C is manually operable through a rocking type changeover lever 16, a manual control line therefor including a control valve 17. This control valve 17 produces a pilot pressure when the backward/forward changeover device C is set to a forward position F or a reverse position R.

The hydraulic clutch 3 is engageable when pressure oil is supplied thereto. An oil line 18 extending from the pump 15 is branched into an oil line 19 leading to the control valve 14 and an oil line 20 leading to the hydraulic clutch 3.

The hydraulic clutch 3 is automatically disengaged when the main change speed gearing A, auxiliary change speed gearing B or backward/forward changeover device C is operated, and automatically engaged again when this operation is completed. Thus, the change speed or changeover operation is carried out without disengaging the main clutch 2.

More particularly, as shown in FIG. 2, a hydraulic change speed control device is provided on the oil line 20 leading to the hydraulic clutch 3. This control device includes, connected parallel to one another, a normally open first switch valve 21 which is closed when a secondary hydraulic pressure exceeds a first set level Q1, a normally closed second switch valve 27 which is opened when the secondary hydraulic pressure exceeds a second set level Q2 higher than the first set level Q1, and a restrictor 28. The oil line 20 further includes a group of logical valves 22 and an accumulator 23 arranged between the restrictor 28 and hydraulic clutch 3. The logical valves 22 comprise four logical valves 22a-22d operable by the pilot pressures supplied from the selector valves 11a, 12a and 13a of the hydraulic cylinders 11, 12 and 13 and the pilot pressure supplied from the control valve 17 of the backward/forward changeover device C. The accumulator 23 acts to check a rapid pressure increase in the hydraulic clutch 3.

According to this construction, when the main change speed gearing A and other devices are set to propel the vehicle as shown in FIG. 2 (FIG. 1 shows a first forward speed position), the logical valves 22 are placed in communication to engage the hydraulic clutch 3. When the main change speed gearing A. auxiliary change speed gearing B or backward/forward changeover device C is operated during a run of the vehicle, a pilot pressure falls at the neutral position halfway through the change speed or changeover operation. Then one of the logical valves 22 stops the pressure oil flowing from the pump 15, and at the same time discharges the pressure oil from the hydraulic clutch 3 to a drain oil line 24, thereby disengaging the hydraulic clutch 3.

Figure 4:
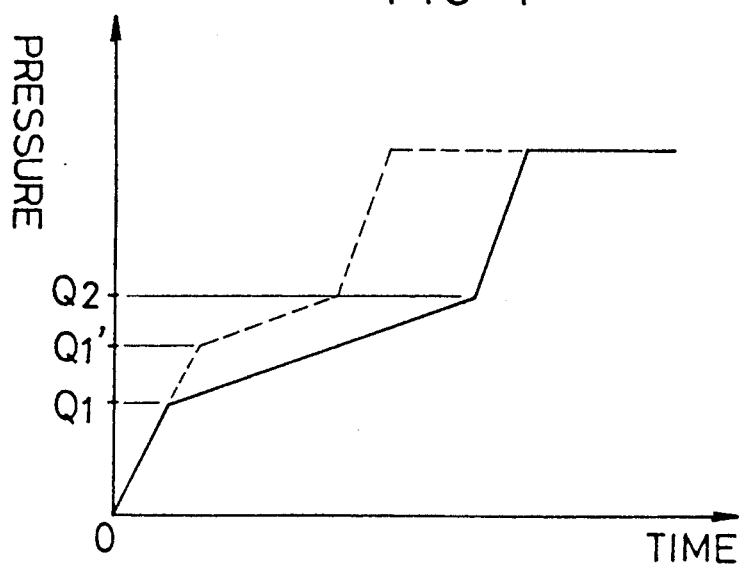
FIG. 4 is a view showing pressure increase characteristics of a hydraulic clutch.

Upon completion of the change speed or changeover operation, the logical valve 22 is placed back in communication to engage the hydraulic clutch 3. At this time the hydraulic clutch 3 is free from a rapid oil pressure increase. That is, as shown in FIG. 4, the first switch valve 21 is opened until the pressure increases from zero to the first set level Q1 which is relatively low. When the pressure reaches the first set level Q1, the first switch valve 21 is closed whereby the pressure oil is supplied through the restrictor 28. The pressure of the hydraulic clutch 3 then increases gradually by the action of accumulator 23. When the pressure reaches the relatively high second set level Q2, the second switch valve 27 is opened.

This hydraulic circuit further includes a switch valve 25 provided on the oil line 18 extending from the pump 15. The switch valve 25 is closed when a pressure in a downstream portion of the oil line 18 exceeds a predetermined level, in order to reduce inconveniences due to high speed operation of the hydraulic cylinders 11, 12 and 13. The hydraulic circuit also includes a relief valve 26 for supplying excess oil to a power steering mechanism 32 through an oil line 18a.

Figure 3:
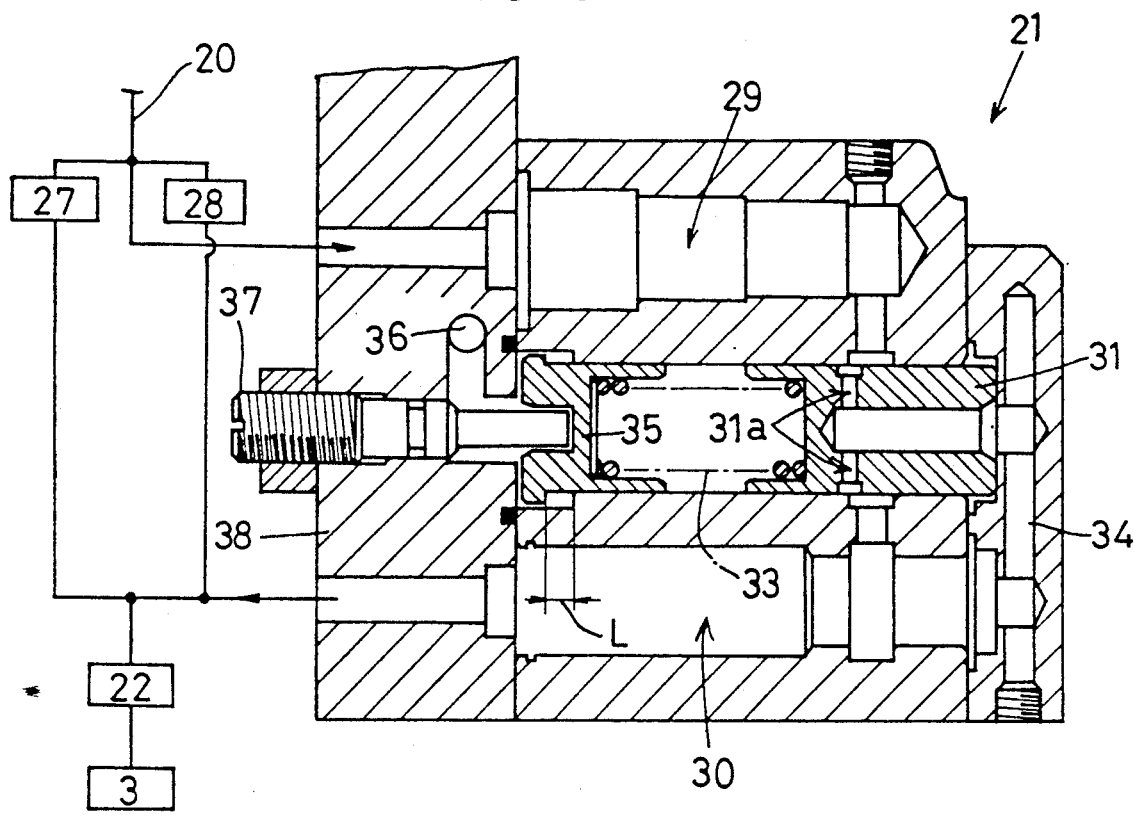
FIG. 3 is a sectional view of a first switch valve of a hydraulic change speed control device.

Details of the first switch valve 21 will be described next. As shown in FIG. 3, the first switch valve 21 includes an inlet port 29 connected to the oil line 20, an outlet port 30 connected to the logical valves 22, and an axially slidable spool 31 defining a communicating passage 31a for connection at selected axial positions to the inlet port 29 and outlet port 30. The spool 31 has an end face urged by a compression coil spring 33 toward a valve opening position (rightward in FIG. 3).

The spool 31 is maintained in the position shown in FIG. 3 by the spring 33 when the pressure in the outlet port 30 (i.e. the secondary hydraulic pressure) is low. In this position, the pressure oil flows from the inlet port 29 to the outlet port 30 through the communicating passage 31a of the spool 31. When the pressure in the outlet port 30 reaches the first set level Q1, pressure oil in a pilot oil line 34 connected to the outlet port 30 causes the spool 31 leftward in FIG. 3 against the force of spring 33, thereby breaking the communication between the input port 29 and output port 30.

A device for varying the urging force of spring 33 of the first switch valve 21 will be described next. As shown in FIG. 3, the first switch valve 21 includes a spring bearing 35 (acting as an urging force varying element) contacting the end of the spring 33 remote from the spool 31. The spring bearing 35 is slidable through a range L. As shown in FIGS. 2 and 3, a pilot oil line 36 extends from the selector valve 13a of the hydraulic cylinder 13 associated with the auxiliary change speed gearing B to the first switch valve 21 for applying a hydraulic pressure to an end face of the spring bearing 35.

In FIGS. 2 and 3, the auxiliary change speed gearing B is in the low speed position L, that is a position for providing first to fourth forward or backward speeds. In this position, the pilot oil line 36 is in a drain state, with the spring bearing 35 lying in a leftward position in the drawings. When, in this state, the control valve 14 is operated within the range of the first speed F1 to fourth speed F4 and the pressure in the output port 30 reaches the first set level Q1 shown in FIG. 4, the spool 31 is caused to slide leftward in the drawings, thereby closing the first switch valve 21. As a result, the pressure in the hydraulic clutch 3 increases with characteristics shown in the solid line in FIG. 4, and the second switch valve 27 is opened at the second set level Q2.

When the control valve 14 is operated from the position shown in FIG. 2 to a range of fifth to eighth speeds F5–F8, the auxiliary change speed gearing B and the selector valve 13a of the hydraulic cylinder 13 associated therewith are moved to the high speed position H. As a result, pilot pressure oil is supplied from the selector valve 13a of the hydraulic cylinder 13 through the pilot oil line 36 to the spring bearing 35, thereby sliding the spring bearing 35 rightward in the drawings.

The urging force of the spring 33 increases when the spring 33 is compressed by the sliding movement of the spring bearing 35 as described above. When, in this state, the control valve 14 is operated within the range of the fifth speed F5 to eighth speed F8, the first switch valve 21 is closed with the pressure in the outlet port 30 reaching a pressure level Q1' which is higher than the first set level Q1. As a result, the pressure in the hydraulic clutch 3 increases with characteristics shown in the dotted line in FIG. 4, and the second switch valve 27 is opened at the second set level Q2.

As shown in FIG. 3, the first switch valve 21 further includes a threaded support element 37 screwed to a casing 38 of the first switch valve 21 to stop the spring bearing 35 at the leftward position. This construction enables fine adjustment to be made of the first set level Q1 with the auxiliary change speed gearing B operated to the low speed position, which is effected by turning the support element 37 to move sideways in FIG. 3.

Figure 5:
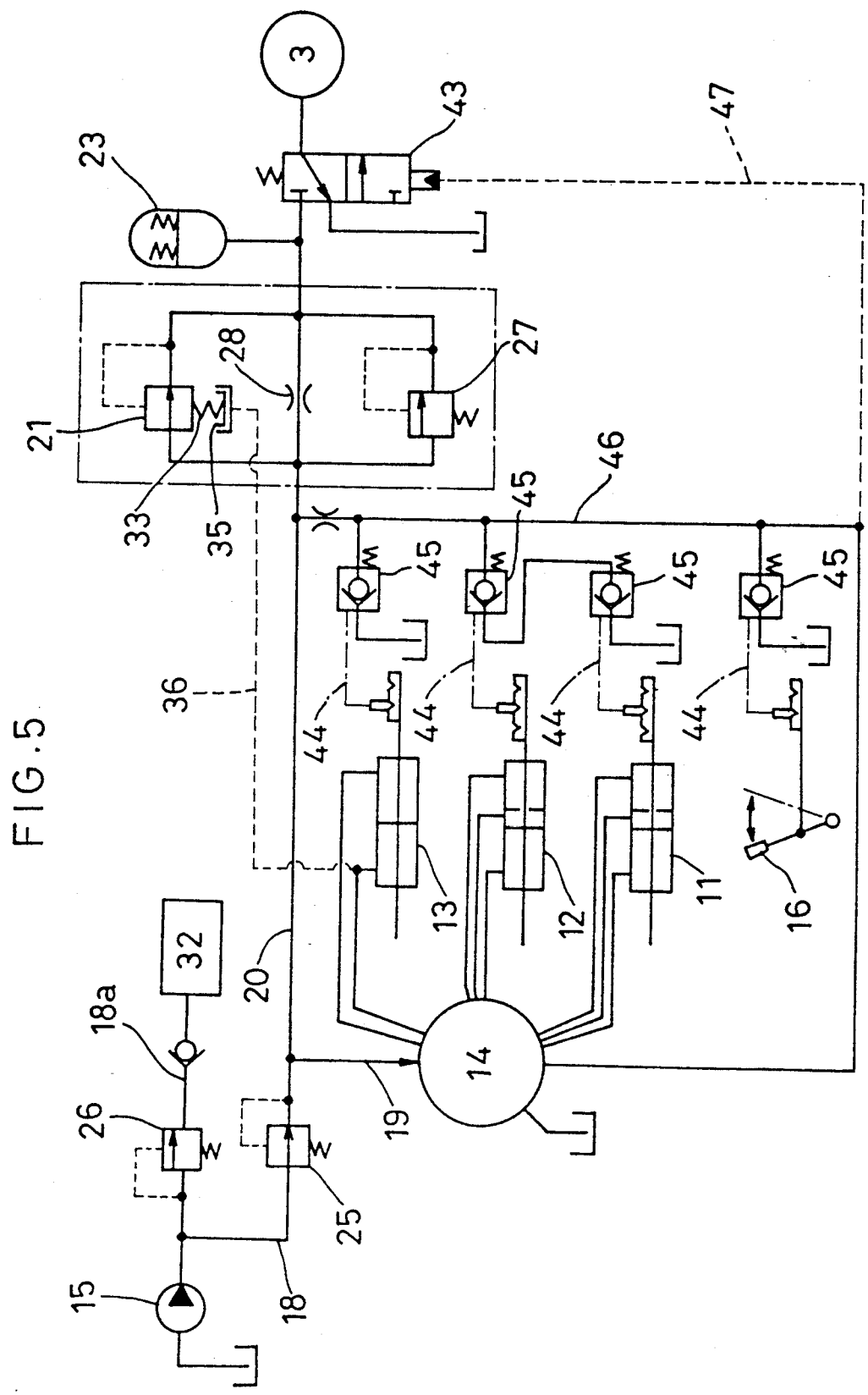
FIG. 5 is a hydraulic circuit diagram showing a different embodiment.

The present invention may be embodied into a hydraulic circuit for vehicle speed changes as shown in FIG. 5. As does the construction shown in FIG. 1 and 2, this construction comprises hydraulic cylinders 11 and 12 for a main change speed gearing A, a hydraulic cylinder 13 for an auxiliary change speed gearing B, and a rotary control valve 14 for controlling the hydraulic cylinders 11, 12 and 13.

An oil line 20 leading to a hydraulic clutch 3 includes a first switch valve 21, a second switch valve 27 and a restrictor 28 arranged parallel to one another. The first switch valve 21, as in FIGS. 2 and 3, includes a movable bearing 35 of a spring 33 for urging the first switch valve 21 to an open position. A pilot oil line 36 extends between the spring bearing 35 and the hydraulic cylinder 13 of the auxiliary change speed gearing B. An accumulator 23 and a pilot controlled switch valve 43 are arranged between the restrictor 28 and hydraulic clutch 3.

According to this construction, when the control valve 14 is operated from one speed position to another speed position and one of the hydraulic cylinders 11, 12 and 13 begins to operate, a logical valves 45 is opened by a mechanical interlocking device 44 associated with that hydraulic cylinder. As a result, pressure in an oil line 46 and a pilot oil line 47 falls to operate the switch valve 43 to an oil exhaust position, thereby disengaging the hydraulic clutch 3.

Then a change speed operation is carried out by the hydraulic cylinder 11, 12 or 13. Upon completion of this operation, the logical valve 45 is closed by the interlocking device 44 to increase the pressure in the pilot oil line 47, thereby operating the switch valve 43 to an oil supplying position. As a result, the hydraulic clutch 3 is engaged by pressure oil flowing thereto through the oil line 20.

At this time, the pressure in the hydraulic clutch 3 increases, in the range of first to fourth speeds, with the characteristics shown in the solid line in FIG. 4 by the action of the first switch valve 21, second switch valve 27 and restrictor 28. In the range of fifth to eighth speeds, the spring bearing 35 of the first switch valve 21 is operated to increase the urging force of spring 33 by the pilot pressure supplied from the hydraulic cylinder 13 of the auxiliary change speed gearing B. As a result, the pressure in the hydraulic clutch 3 increases with the characteristics shown in the dotted line in FIG. 4.

Similarly, when a changeover lever connected to a backward/forward changeover device C is operated, a logical valve 45 is operated through an interlocking device 44 associated therewith, to control the switch valve 43 for engaging and disengaging the hydraulic clutch 3.

What is claimed is:

1. A hydraulically operable transmission comprising change speed gear means,
    hydraulic change speed control means for operating said change speed gear means, including a plurality of hydraulic actuators interlocked with said change speed gear means, and a pilot type control valve for supplying and discharging pressure oil to/from said hydraulic actuators, thereby changing the transmission from a low speed condition to a high speed condition,
    a hydraulic clutch engageable and disengageable with a change speed operation of said change speed gear means caused by said control valve,
    an oil line for supplying pressure oil to said hydraulic clutch, and
    pressure increase adjusting means connected to said oil line for adjusting pressure increase characteristics when said hydraulic clutch is engaged, said pressure increase adjusting means including a normally open first switch valve (21) closable when a secondary hydraulic pressure exceeds a first set level, a normally closed second switch valve (27) openable when the secondary hydraulic pressure exceeds a second set level higher than said first set level, a restrictor (28), a spring (33) for urging said first switch valve toward an open position, and urging force varying means for varying an urging force of said spring, said urging force varying means being operable by a pilot pressure via a pilot oil line (36) provided between said first switch valve (21) and a hydraulic change speed control means to increase the urging force of said spring when said hydraulic change speed control means is operated to a high speed position, said first and second switch valves and said restrictor being provided on said oil line (20) and connected parallel to one another.

2. A transmission as claimed in claim 1, wherein said oil line includes an accumulator disposed between said pressure increase adjusting means and said hydraulic clutch.

3. A transmission as claimed in claim 1, wherein said first switch valve includes a spool defining a communicating passage extending radially thereof, said communicating passage having one end connectable to an inlet port and the other end connectable to an outlet port at selected axial positions, said spool being axially urged to an open position by said spring.

4. A transmission as claimed in claim 3, wherein said spring is a compression coil spring.

5. A transmission as claimed in claim 4, wherein said urging force varying means includes a spring bearing for supporting an end of said spring remote from said spool, said spring bearing being slidable axially of said spring by a pilot pressure supplied from said change speed control means to vary the urging force of said spring acting on said spool.

* * * * *